US007713411B2

(12) United States Patent
Banister et al.

(10) Patent No.: US 7,713,411 B2
(45) Date of Patent: May 11, 2010

(54) FLUID BED FILTER-DRYER APPARATUS

(75) Inventors: John Patrick Banister, Huntsville, AL (US); Robert R. Garner, Jr., Hampton Cove, AL (US)

(73) Assignee: Applied Chemical Technology, Inc., Florence, AL (US)

( * ) Notice: Subject to any disclaimer, the term of this patent is extended or adjusted under 35 U.S.C. 154(b) by 0 days.

(21) Appl. No.: 11/898,651

(22) Filed: Sep. 13, 2007

(65) Prior Publication Data

US 2008/0067137 A1 Mar. 20, 2008

Related U.S. Application Data

(63) Continuation of application No. 10/439,379, filed on May 16, 2003, now abandoned.

(51) Int. Cl.
*F26B 7/00* (2006.01)
*B01D 29/54* (2006.01)
*F26B 19/00* (2006.01)

(52) U.S. Cl. ....................... 210/232; 210/248; 210/267; 210/251; 210/411; 210/416.1; 210/771; 210/791; 34/82; 34/90; 34/187; 34/218

(58) Field of Classification Search ....................... None
See application file for complete search history.

(56) References Cited

U.S. PATENT DOCUMENTS 376,095 A * 1/1888 Hyatt ......................... 210/327
507,350 A * 10/1893 Bohm ......................... 210/267
517,240 A * 3/1894 Roger ......................... 210/358
522,512 A * 7/1894 Cook ......................... 210/267
559,249 A * 4/1896 Wright ......................... 210/236
589,709 A * 9/1897 Kunzel ....................... 74/594.2
611,489 A * 9/1898 Katzenstein ................ 210/267
624,633 A * 5/1899 Edwardes ................... 210/171
642,907 A * 2/1900 Hoey .......................... 210/267
719,438 A * 2/1903 Orossman ................... 210/230
726,427 A * 4/1903 Haussermann .............. 210/451
782,843 A * 2/1905 Geib .......................... 100/245
903,697 A * 11/1908 Frasch ........................ 210/272

(Continued)

OTHER PUBLICATIONS

"The Nutsche Pressure Filter" from www.solidliquid-seperation.com/PressureFilters/Nutsche/nutsche.htm.*

(Continued)

*Primary Examiner*—Robert James Popovics
(74) *Attorney, Agent, or Firm*—Paul E. White, Jr.; Manelli Denison & Selter PLLC

(57) ABSTRACT

A filter-dryer apparatus employing a single container for both filtering and drying operations including a container holding a material to be filtered and dried, adapted to connect to a filter system and to connect to a fluid bed dryer system, and a process for separating particulates from liquids by the operations of filtration and drying, which includes the steps of providing a single container for both filtering and drying operations; introducing a mixture of particles and liquid to said container; connecting the container to a filter system and filtering the particulates from the liquid; detaching the container from the filter system; connecting the container to a fluid bed drying system and removing the liquid from the particulates to result in dry particulates.

3 Claims, 8 Drawing Sheets

U.S. PATENT DOCUMENTS

| | | | | | |
|---|---|---|---|---|---|
| 1,043,939 | A | * | 11/1912 | Isherwood | 210/358 |
| 1,059,574 | A | * | 4/1913 | Shatto | 422/281 |
| 1,120,629 | A | * | 12/1914 | Salisbury | 210/232 |
| 1,409,364 | A | * | 3/1922 | Dobbs et al. | 422/124 |
| 1,546,871 | A | * | 7/1925 | Thompson | 210/772 |
| 1,567,990 | A | * | 12/1925 | Apablasa | 210/120 |
| 1,574,557 | A | * | 2/1926 | Coe | 210/272 |
| 1,698,743 | A | * | 1/1929 | Sweeney | 210/670 |
| 1,865,061 | A | * | 6/1932 | Grob | 210/769 |
| 1,898,604 | A | * | 2/1933 | Twiss et al. | 159/49 |
| 2,254,597 | A | * | 9/1941 | Berger et al. | 208/31 |
| 2,404,215 | A | * | 7/1946 | Cavanaugh | 210/772 |
| 2,496,370 | A | * | 2/1950 | Baily | 210/399 |
| 2,540,474 | A | * | 2/1951 | Cox | 210/787 |
| 2,552,360 | A | * | 5/1951 | Zichis | 241/23 |
| 2,605,903 | A | * | 8/1952 | Schuller | 210/331 |
| 2,770,181 | A | * | 11/1956 | Kahan | 99/298 |
| 2,824,646 | A | * | 2/1958 | Willenborg | 210/771 |
| 2,946,524 | A | * | 7/1960 | Keirnan | 241/98 |
| 3,293,227 | A | * | 12/1966 | Boggess et al. | 528/499 |
| 3,403,640 | A | * | 10/1968 | Schroder | 366/100 |
| 3,441,141 | A | * | 4/1969 | Eicher et al. | 210/241 |
| 3,509,835 | A | * | 5/1970 | Dibelius et al. | 110/220 |
| 3,743,539 | A | * | 7/1973 | Kroyer | 127/16 |
| 3,980,560 | A | * | 9/1976 | Eades | 210/141 |
| 4,081,381 | A | * | 3/1978 | Rosenmund et al. | 210/408 |
| 4,337,584 | A | * | 7/1982 | Johnson | 34/65 |
| 4,376,705 | A | * | 3/1983 | Komura et al. | 210/413 |
| 4,399,042 | A | * | 8/1983 | Stannard et al. | 210/791 |
| 4,417,980 | A | * | 11/1983 | Baur et al. | 210/91 |
| 4,592,835 | A | * | 6/1986 | Grieder et al. | 210/107 |
| 4,699,013 | A | * | 10/1987 | Kroner | 73/863.23 |
| 4,705,222 | A | * | 11/1987 | Shohet | 241/69 |
| 4,828,697 | A | * | 5/1989 | Kuhnt et al. | 210/408 |
| 4,888,111 | A | * | 12/1989 | Diemer | 210/178 |
| 4,914,834 | A | * | 4/1990 | Sime | 34/169 |
| 4,975,183 | A | * | 12/1990 | Glorer | 210/107 |
| 5,008,009 | A | * | 4/1991 | Ciaffoni | 210/193 |
| 5,139,667 | A | * | 8/1992 | Reneau, Jr. | 210/319 |
| 5,259,955 | A | * | 11/1993 | Bolton | 210/406 |
| 5,269,923 | A | * | 12/1993 | Diemer et al. | 210/413 |
| 5,356,541 | A | * | 10/1994 | Wickzell | 210/791 |
| 5,389,244 | A | * | 2/1995 | Cranston | 210/106 |
| 5,446,974 | A | * | 9/1995 | Gubler | 34/82 |
| 5,544,424 | A | * | 8/1996 | Haleen | 34/181 |
| 5,544,425 | A | * | 8/1996 | Haleen | 34/187 |
| 5,546,676 | A | * | 8/1996 | Haleen | 34/187 |
| 5,564,350 | A | * | 10/1996 | Peplinski | 110/344 |
| 5,609,835 | A | * | 3/1997 | Pitcher | 422/225 |
| 5,653,869 | A | * | 8/1997 | Evangelisti | 210/232 |
| 5,659,971 | A | * | 8/1997 | Haleen | 34/166 |
| 5,693,362 | A | * | 12/1997 | Boos et al. | 427/10 |
| 5,709,036 | A | * | 1/1998 | Haleen | 34/179 |
| 5,746,007 | A | * | 5/1998 | Haleen | 34/187 |
| 5,759,231 | A | * | 6/1998 | Bremer et al. | 75/379 |
| 6,290,383 | B1 | * | 9/2001 | Shohet | 366/132 |
| 6,601,315 | B2 | * | 8/2003 | Stafford | 34/80 |
| 6,890,129 | B2 | * | 5/2005 | Fabbri | 406/106 |
| 6,959,504 | B2 | * | 11/2005 | Fabbri | 34/380 |
| 6,993,856 | B2 | * | 2/2006 | Benali et al. | 34/583 |
| 7,473,375 | B2 | * | 1/2009 | Stoerzer | 210/791 |
| 2002/0073572 | A1 | * | 6/2002 | Stafford | 34/80 |
| 2004/0050802 | A1 | * | 3/2004 | Banister et al. | 210/771 |
| 2005/0050761 | A1 | * | 3/2005 | Benali et al. | 34/583 |
| 2008/0067137 | A1 | * | 3/2008 | Banister et al. | 210/771 |
| 2008/0173594 | A1 | * | 7/2008 | Stoerzer | 210/791 |

OTHER PUBLICATIONS

Pope Scientific Nutsche Filter-Dryers Brochure, 2 pages, Copyright 1999.*

* cited by examiner

FLUID BED FILTER-DRYER APPARATUS

This is a continuation application of U.S. application Ser. No. 10/439,379 filed May 16, 2003 now abandoned.

BACKGROUND OF THE INVENTION

This invention is generally directed to an apparatus and methods of its use for separating particulates from liquids by filtration and further removing liquids from the particulates by drying. The present invention is greatly efficient in filtering and drying to yield a high quality product by employing a single container for both filtering and drying operations.

As known, particularly in producing chemical and pharmaceutical compositions, use is made of large filtration chambers and fluid-bed dryers. The filtration chambers generally consist of vessels, usually cylindrical, comprising a bottom part, a filter plate assembly, and a top part having diameters between 300 and 5,000 mm. The filtration chambers are used to remove liquids from particulate materials and solids.

Furthermore, the solids can be transferred to a fluid-bed dryer that uses a gas stream to remove moisture from the solids. Significantly, during the transfer of the solids from the filtration chamber to the fluid-bed dryer, the solids can be contaminated, spilled, lost, and/or degraded.

BRIEF SUMMARY OF THE INVENTION

The present invention provides a method and apparatus by means which a particulate material is filtered and dried in a single product container. Performing both filtering and drying operations in a single product container reduces the risk of contaminating, degrading, or losing the particulate material.

The apparatus of the present invention filters and dries a particulate material having a liquid (e.g. solvent) content and comprises a single product container holding the material, that fits and adapts to a pressure filter system and a fluid-bed dryer system. Examples of typical solvents include the following: water, isopropyl alcohol, acetone, methyl alcohol, ethylene dichloride, methyl chloride, toluene, xylene, benzene, methyl ethyl ketone and hexane. Particle shapes of the particulate material have sphericity shape factors of 0.3 to 1.0 (1.0 being a sphere). The particulate sizes range from 1 μm to 20,000 μm, and more commonly from 2 μm to 10,000 μm.

Regarding "shape factors", it is understood that many particles in packed beds are often irregular in shape. The equivalent diameter of a particle is defined as the diameter of a sphere having the same volume as this particle. Sphericity shape factor of a particle is the ratio of the surface area of this sphere having the same volume as the particle to the actual surface area of the particle.

The product container includes a vessel, usually cylindrical, having a detachable bottom plate forming a support for a filtering assembly. The filter assembly 13 comprises a filter sheet and a filter netting bed, both anchored to the bottom plate. The bottom plate can be removed.

The product container also includes a detachable upper plate forming a support for a gas distribution plate. The gas distribution plate comprises a perforated, sintered, or grid plate with or without a retention screen. The gas distribution plate can be installed before or after the filtering process.

After filtering the particulate material, the gas distribution plate is installed and the product container is inverted. The gas distribution plate supports the filtered material in the inverted position. The filter plate assembly is then removed from the product container.

The product container is installed into a fluid-bed dryer system. The fluid-bed dryer system consists of a lower plenum, an upper plenum, a dust collector, and a gas handling system. The gas handling system comprises at least one of a heater, a pressure blower, and a condenser.

The product container is installed between the lower and upper plenums. The gas (for example, air, argon, nitrogen, and carbon dioxide) stream is introduced into lower plenum. The gas stream flows through the gas distribution plate and the particulate material. The solvent in the particulate material is removed by the gas stream.

A filtering device in the upper plenum, above the product container, removes particulates in the gas stream and may be recycled. The solvent can be condensed from the gas stream and retrieved. The gas stream can be recycled to the dryer or vented to the atmosphere.

After the particulate material is adequately dried, the product is removed from the product container for packaging or additional processing.

DETAILED DESCRIPTION OF THE INVENTION

The present invention provides a method and apparatus by means which a particulate material is filtered and dried in a single product container.

Figure 1:
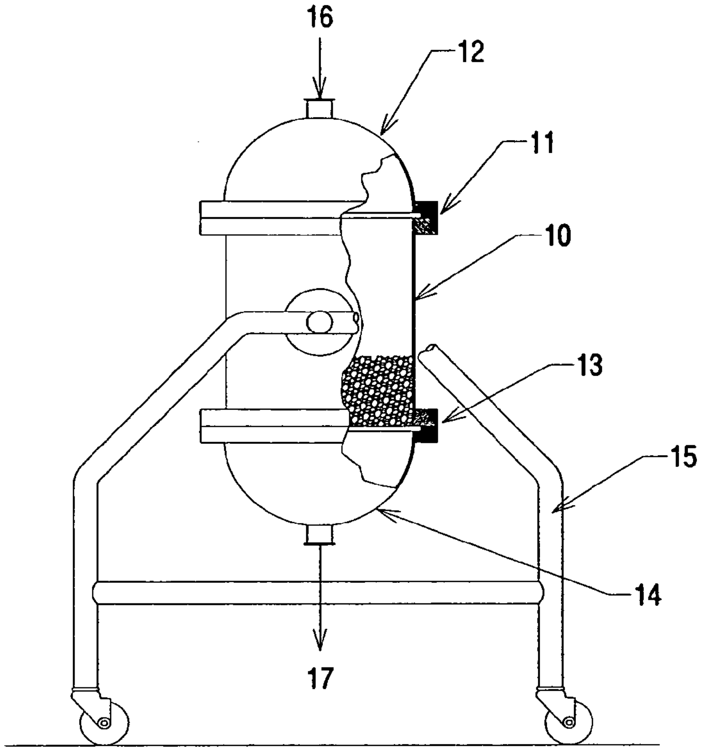
FIG. 1 is a side view with cut away of the product container adapted to filtration device.

The product container 10 is usually mounted on a trolley 15 that allows the container to be moved to and from the processing areas (FIG. 1). The trolley 15 can have a system that allows the product container to invert. Furthermore, a lifting/rotating device can be utilized to perform the product bowl inversion.

The liquid/solids are introduced into the product container 10 with the detachable filter assembly 13 attached, which are components of the nutsche type filter assembly shown in FIG. 1. The solvent content of the particulate material before filtering is 15%-90%. When the material is fed into the product container 10, the discharge head 14 can be attached or unattached to the product container 10 shown in FIG. 1.

After the material is fed into the product container 10, the inlet head 12 to the nutsche filter assembly is attached, FIG. 1. On the inlet head 12, a gas stream is fed into the gas inlet nozzle 16 shown in FIG. 1. The gas stream pressurizes the product container 10. The operating pressure is 0.5 psia-100 psia at a temperature of 0-300° F. The pressure above the material forces liquid through the filtering assembly 13 shown in FIG. 1. The liquid flows through the filter assembly and into the discharge head 14 shown in FIG. 1. The liquid flows out of the discharge head through the liquid nozzle 17 shown in FIG. 1.

After some of the liquid is removed from the material, the filter is depressurized. The solvent content of the particulate material after filtering is 1%-50%. The inlet head 12 is removed from the product container. The detachable gas distribution plate 11 is installed above the material in the product container 10 shown in FIG. 1.

Figure 2:
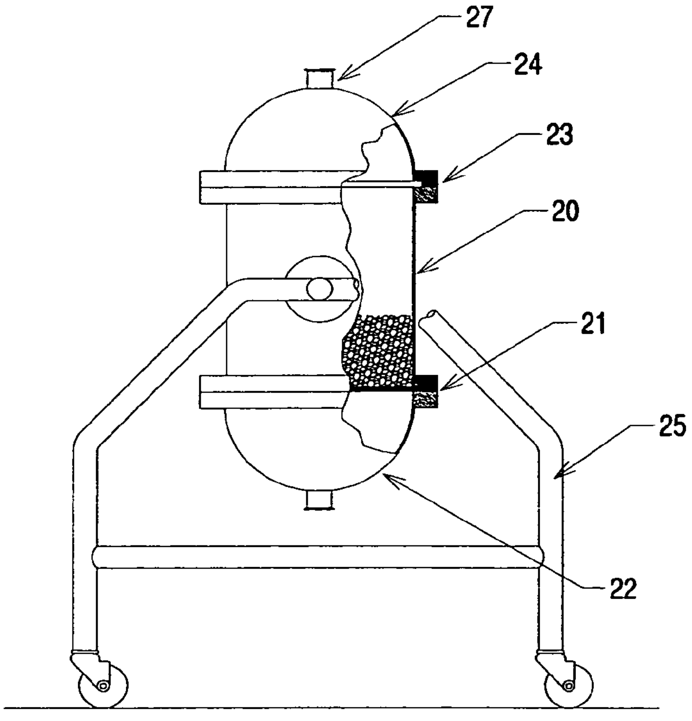
FIG. 2 is a side view with cut away of the product container prepared for adapting to dryer.

The nutsche type filter assembly is inverted so that the gas distribution plate 21 is on the bottom of the product container 20 shown in FIG. 2. Once the product container 20 is positioned in the orientation shown in FIG. 2, the discharge head 24 and detachable filter assembly 23 are removed from the product container 20 shown in FIG. 2.

The product container 30 with the gas distribution plate 31 is transported to the fluid-bed assembly. A trolley 35 shown in FIG. 3 can be used to transport the product container. The trolley 35 can also be equipped with a mechanism to invert the product container. Otherwise, a separate machine, or person(s), inverts the product container.

Figure 3:
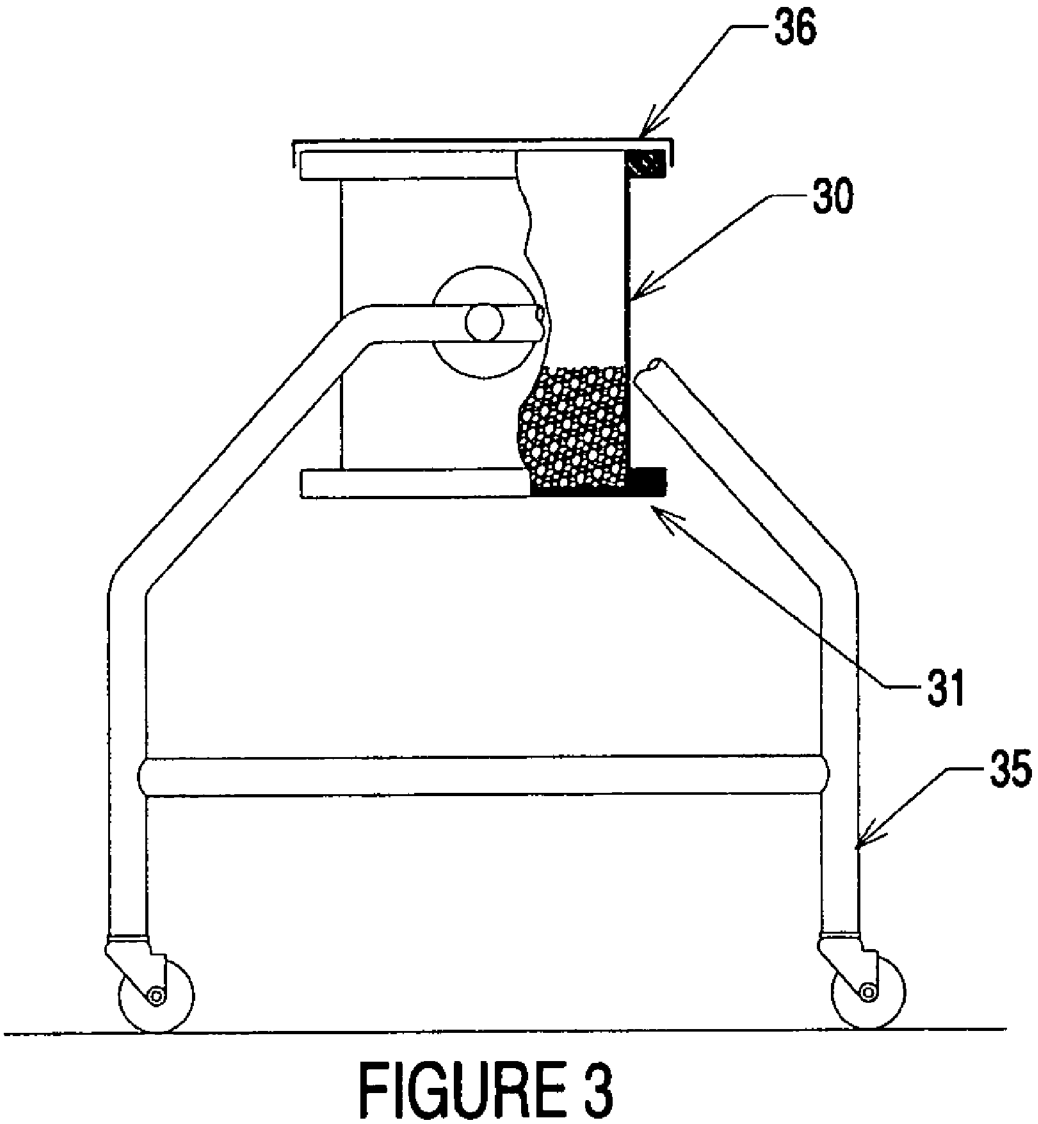
FIG. 3 is a side view of a trolley used to transport the product container.

A detachable cover 36 shown in FIG. 3 can be used during the transport operation. Before the product container 30, shown in FIG. 3, is installed into the fluid-bed assembly, the detachable cover 36 is removed.

Figure 4:
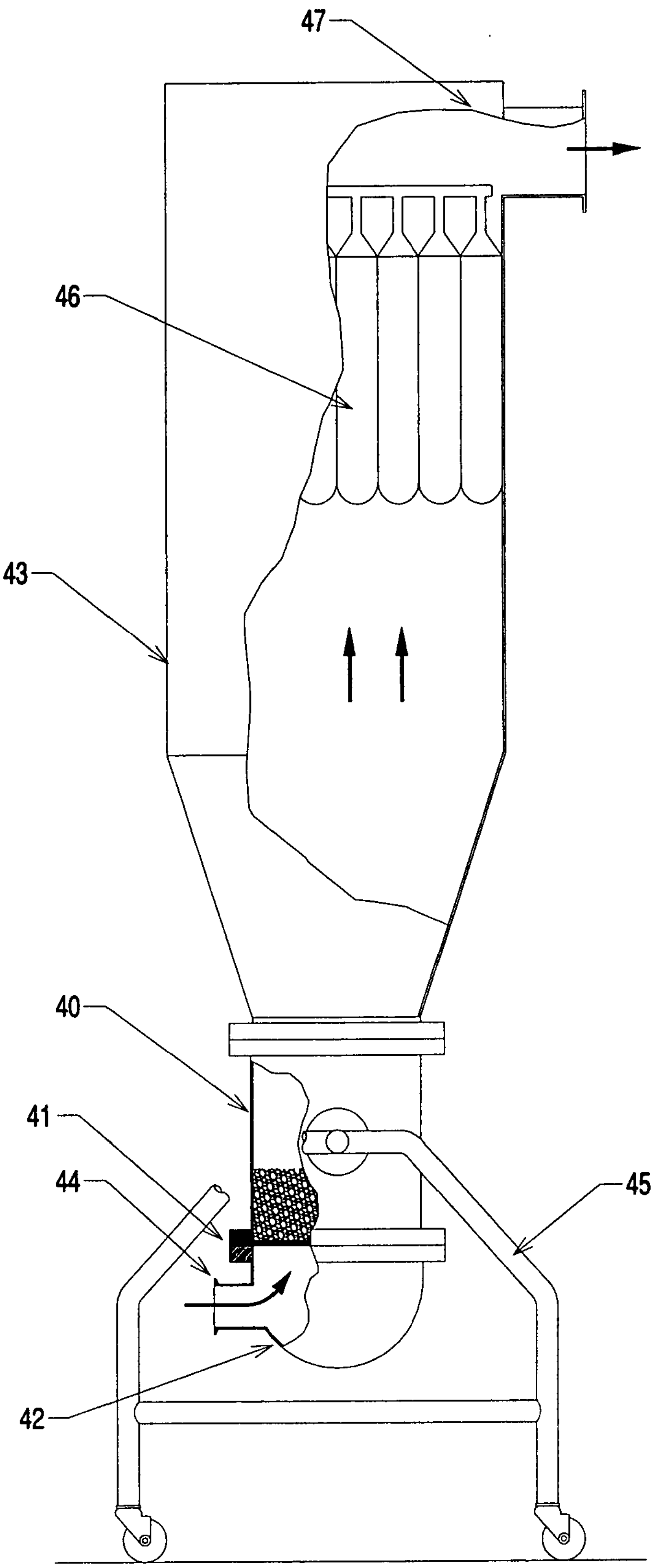
FIG. 4 is a side view of the product container adapted to drying device.

The product container 40 is installed between the upper plenum 43 and lower plenum 42 of the fluid-bed assembly shown in FIG. 4. Once the lower plenum 42, product container 40, and upper plenum 43 are sealed, the gas stream is introduced into the gas inlet nozzle 44 on the lower plenum 42. The gas flows at a velocity of 10 fpm-600 fpm at the gas distribution plate. The gas stream flows up through the material. The liquid evaporates in the gas stream. Particulates in the gas stream are filtered in the upper plenum 43 by a filtering device 46 shown in FIG. 4.

Figure 7:
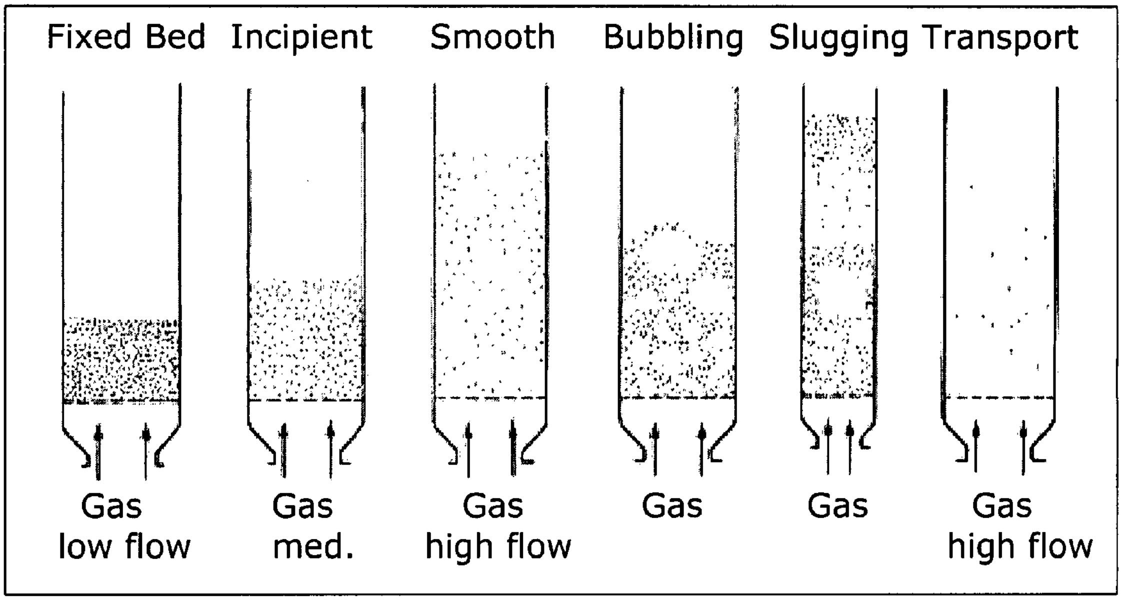
FIG. 7 shows gas stream flows out of the fluid-bed assembly operated to generate different types of fluidization.

The gas stream flows out of the fluid-bed assembly through the exhaust nozzle 47 shown in FIG. 4. The gas flow rate is adjusted so that the material behaves as a fixed bed, incipient fluidization, smooth fluidization, bubbling fluidization, slugging fluidization shown in FIG. 7. The gas flow rate is less than the flow rate where dilute phase or transport fluidization occurs, which is shown in FIG. 7. The solvent content of the particulate material after drying is 0%-20%.

Figure 5:
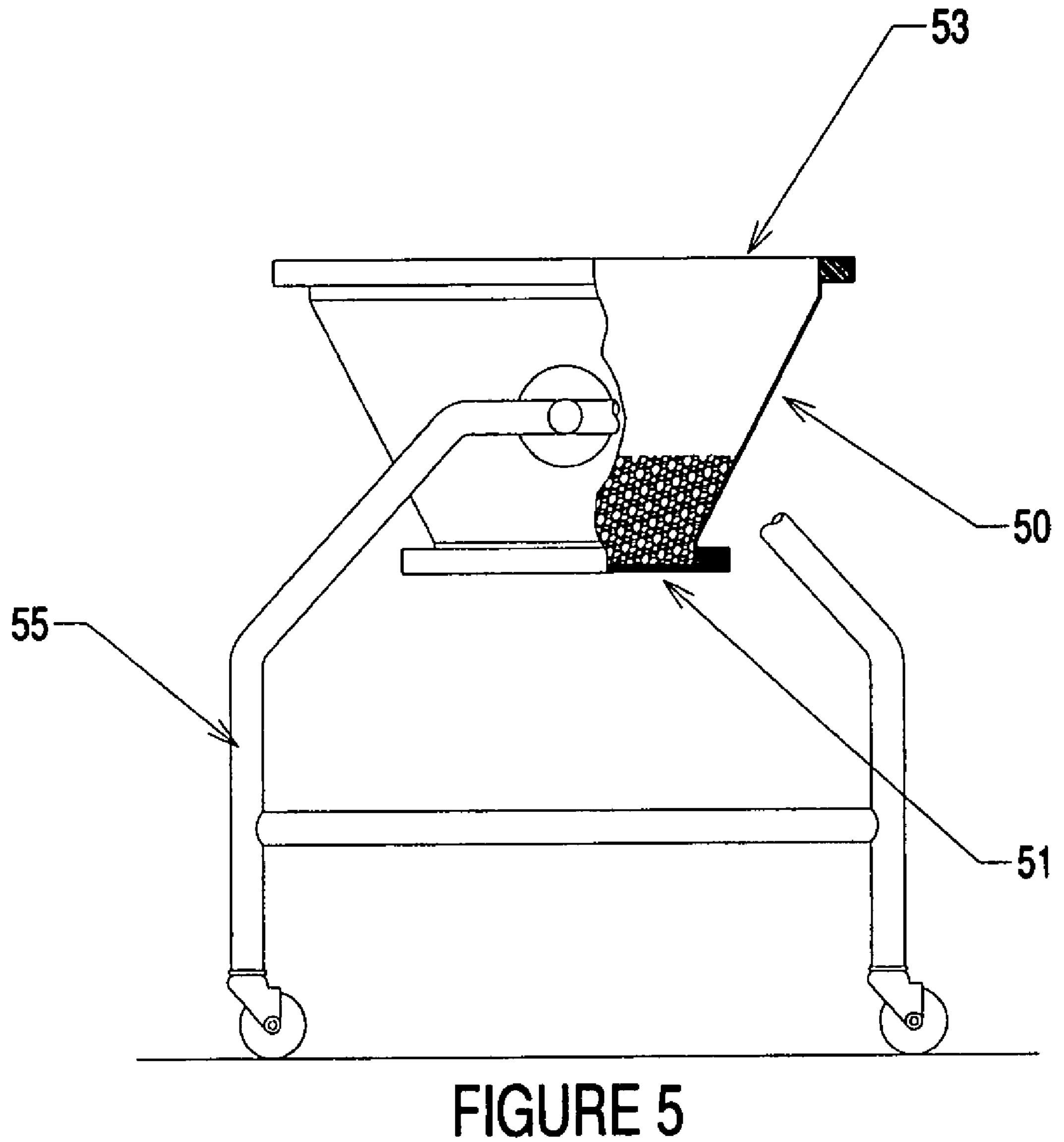
FIG. 5 is a side view of an embodiment of the product container wherein the diameter of the container is smaller at the gas distribution plate.

An additional structural embodiment is shown in FIG. 5. In FIG. 5, the product container 50 is conical such that the area of the gas distribution plate 51 is smaller than the area of the filtering assembly 53. That is, the diameter of the product container is smaller at the gas distribution plate, which gives the product container an expansion zone. The expansion zone reduces the amount of material entrained in the gas stream during the fluidization process.

Figure 6:
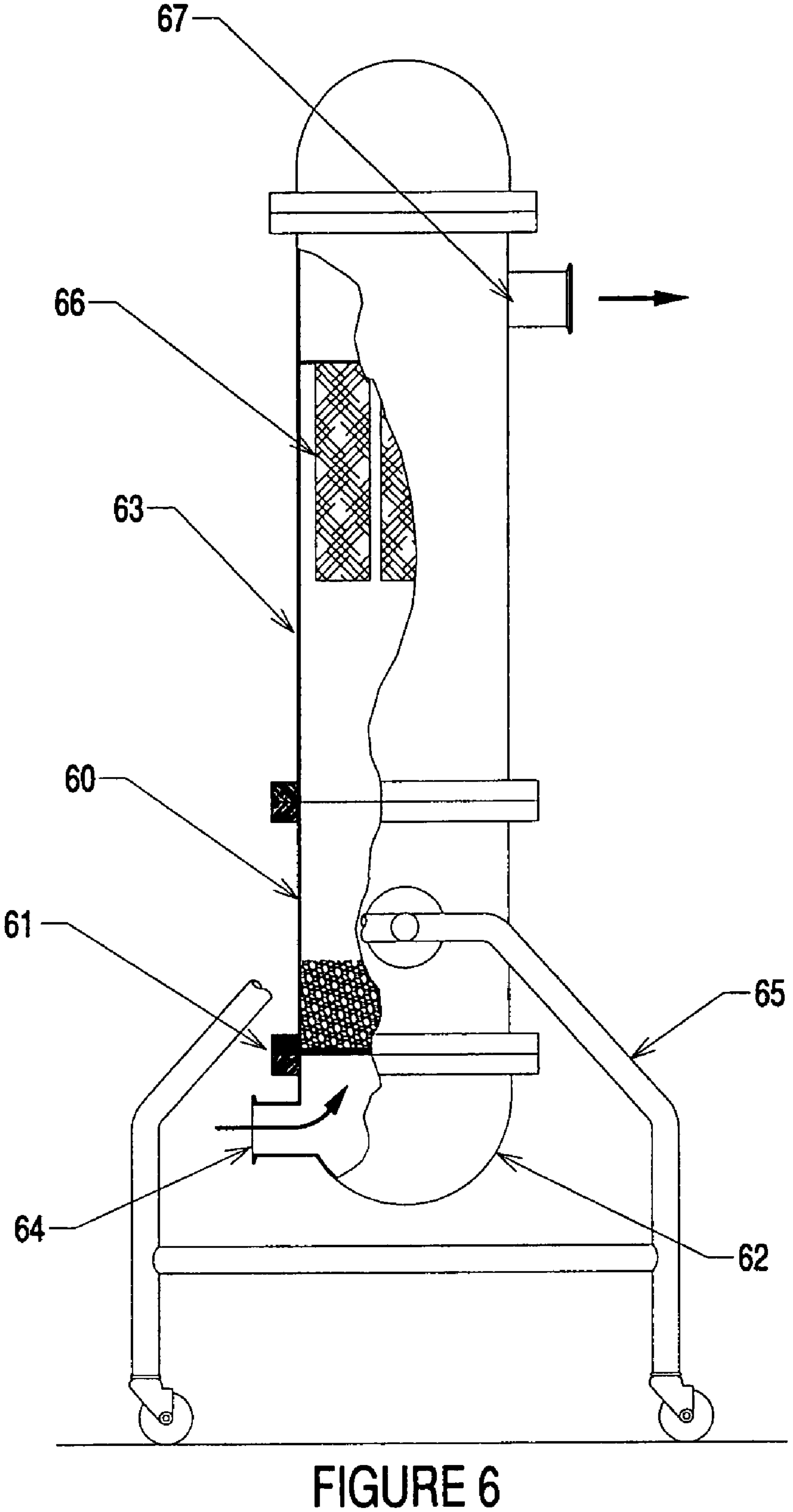
FIG. 6 is a side view of an embodiment of the product container adapted to a drying device wherein the fluid-bed assembly has an upper plenum having the same diameter as the container.

Another structural embodiment is a fluid-bed assembly with an upper plenum 63 having the same diameter as the product container 60 shown in FIG. 6.

Figure 8:
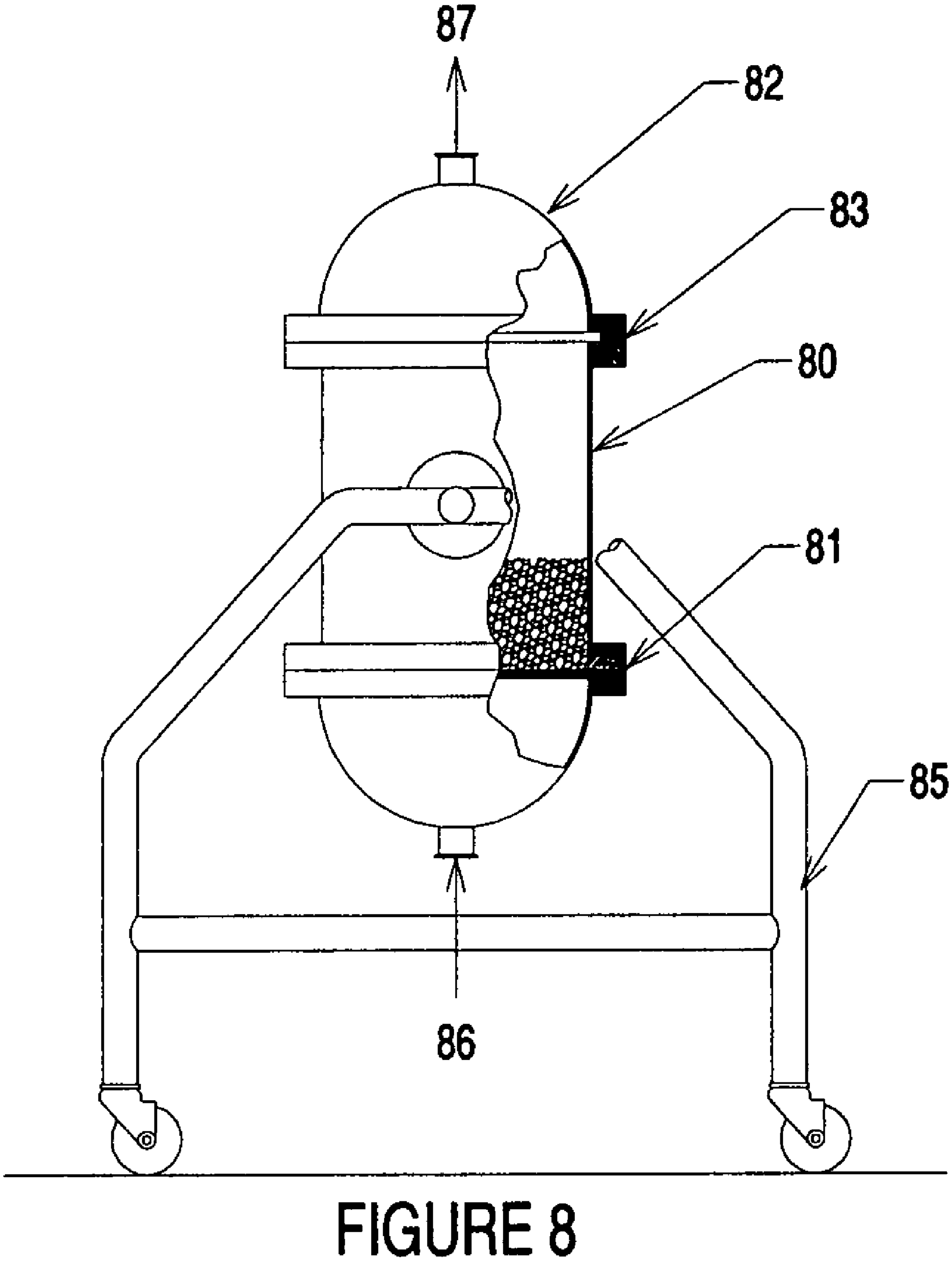
FIG. 8 is a side view of an embodiment of the product container adapted to a filtering-drying assembly wherein the inlet head is not removed between the filtering and drying process and the discharge head is also used as the upper plenum.

Using the inlet head 82 shown in FIG. 8 as the lower plenum is another structural embodiment. That is, the inlet head is not removed between the filtering and drying process. Instead, it is used as the gas chamber directly below the gas distribution plate 81. The discharge head 84 is also used as the upper plenum in this structural embodiment shown in FIG. 8. A filtering device downstream from the upper plenum removes fugitive particulates in the gas stream. The filter plate assembly 83 can either be removed or left in the assembly during the drying step. The gas stream flows into the inlet nozzle 86 and out of the discharge nozzle 87.

Figure 9:
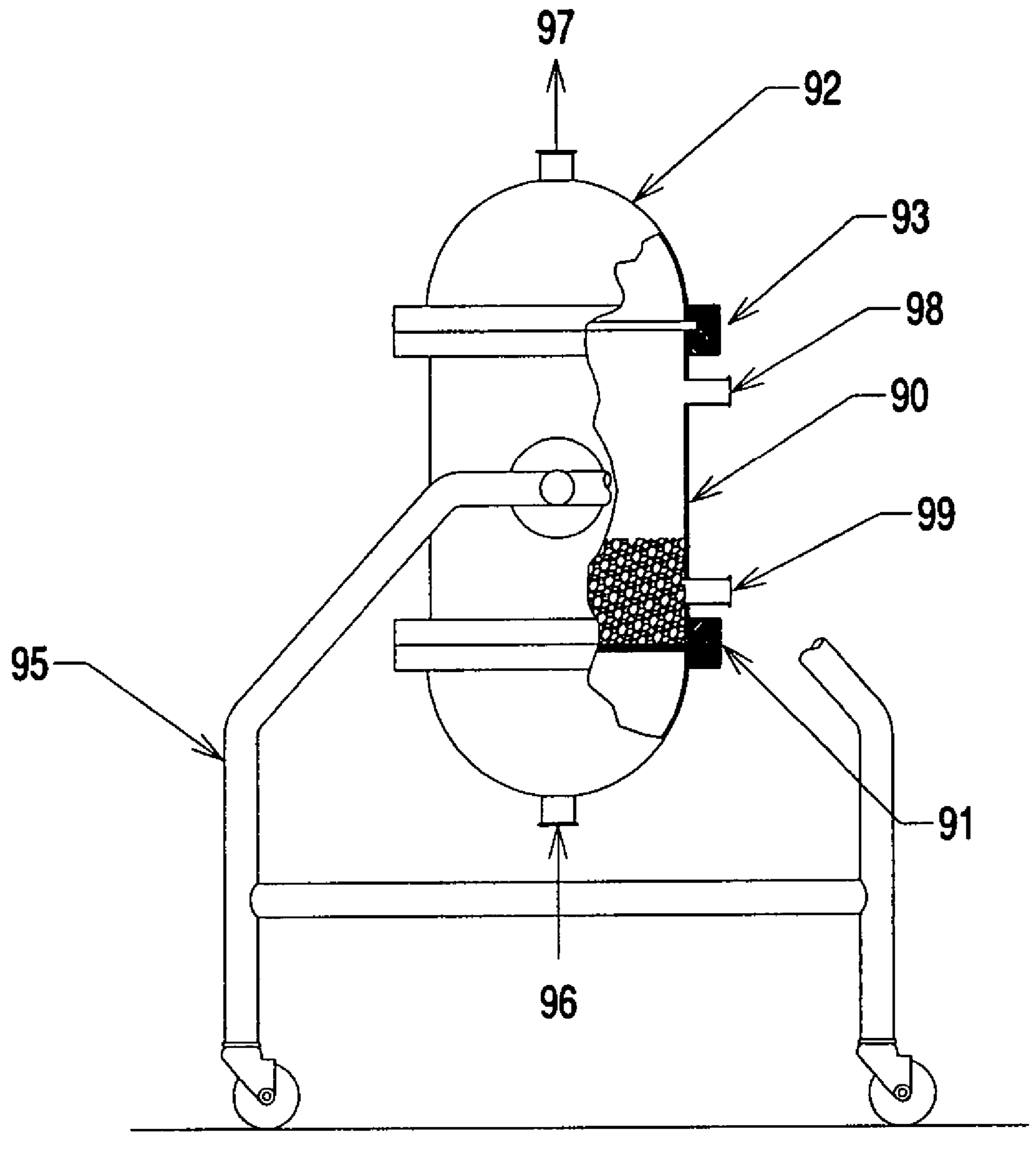
FIG. 9 is a side view of an embodiment of the product container adapted to a filtering-drying assembly wherein the gas stream flows into the inlet nozzle and the outlet nozzle during the drying process.

Another structural embodiment is shown in FIG. 9. In FIG. 9, the gas stream flows into the inlet nozzle 96 and the outlet nozzle 98 on the product container 90 during the drying process. During the filtering process, the gas is fed into the gas nozzle 99 on the product container 90 shown in FIG. 9. The liquid removed from the material flows out of the outlet nozzle 97 on the discharge head 92 shown in FIG. 9.

The invention is further illustrated, but not limited, by the following Examples:

EXAMPLES

The filter/dryer apparatus of the present invention was operated and tested on several types of materials. The filter/dryer removes the liquid from a mixture of a liquid and bulk solid, where as the solid is insoluble or soluble in the liquid.

The general procedure entailed the following:

First, 300 ml of the bulk solid was measured into a 1000 ml beaker. Second, the liquid was added to the beaker until the material was completely submerged in the liquid. That is, the liquid level and bulk solid level were equal in the beaker. Third, the volume of liquid required to submerge the bulk solid was recorded.

Once the initial solid/liquid mixture was prepared, the mixture was poured in a 4" (Examples 1-4) or 16" (Examples 5 and 6) diameter product container 10, which is a component of the nutsche filter assembly shown in FIG. 1. The inlet head 12 was attached to the nutsche filter assembly. On the inlet head 12, the air supply line was attached to the gas inlet nozzle 16 and the filter was pressurized. The pressure above the mixture forced the liquid through the filtering assembly 13, shown in FIG. 1. The liquid flowed through the filter assembly and into the discharge head 14 shown in FIG. 1. The liquid flowed out through the liquid nozzle 17 located on the discharge head 14 shown in FIG. 1.

After 15 minutes of filtering the liquid in the nutsche filter, the filter assembly was depressurized. The amount of liquid that flowed out of the discharge head was recorded. The inlet head 12 was removed and the detachable gas distribution plate 11, shown in FIG. 1, was installed. The nutsche filter assembly was inverted so that the gas distribution plate 21 was on the bottom of the product container 20, shown in FIG. 2. Once the product container 20 was positioned in the orientation shown in FIG. 2, the discharge head 22 and detachable filter assembly 23 were removed from the product container 20 shown in FIG. 2.

The product container 30 with the gas distribution plate 31 was transported to the fluid-bed assembly. A trolley 35 shown in FIG. 3 can be used to transport the product container. The trolley 35 can also be equipped with a mechanism to invert the product container.

A detachable cover 36 shown in FIG. 3 can be used during the transport operation. Before the product container 30, shown in FIG. 3, was installed into the fluid-bed assembly, the detachable cover 36 was removed.

In Examples 1-4, the product container 40 was installed between the upper plenum 43 and lower plenum 42 of the fluid-bed assembly shown in FIG. 4. Once the lower plenum 42, product container 40, and upper plenum 43 were sealed, the gas stream was introduced into the gas inlet nozzle 44 on the lower plenum 42. The gas stream flowed up through the mixture of solid/liquid for 15 minutes. The liquid evaporated in the gas stream. Particulates in the gas stream were filtered in the upper plenum 43 by a filtering device 46 shown in FIG. 4. The gas stream flowed out of the fluid-bed assembly through the exhaust nozzle 47 shown in FIG. 4. The rate and temperature of the gas stream was recorded. The moisture content of the dried material was measured by an oven moisture method. The final moisture of the dried material was recorded.

In Examples 5 and 6, the product container and gas distribution plate were transported to a fluid-bed dryer assembly shown in FIG. 6, where the upper plenum had a diameter, 16", identical to the distribution plate, 16". The fluid-bed dryer assembly and product container were sealed, and a heated argon gas stream, flowed up through the liquid at such a rate, where the bed behaved with bubbling fluidization characteristics shown in FIG. 7. After the argon gas stream fluidized the liquid/solid mixture for 120 minutes, the liquid content of the mixture in the product bowl was measured and recorded. The gas stream in Examples 5 and 6 was recirculated. The gas stream from the fluid-bed dryer was passed through a condenser, which removed the majority of the solvent in the argon gas stream. The gas stream was heated by a heat exchanger before being recirculated to the fluid-bed dryer apparatus. Since a small amount of solvent was recirculated to the inlet of the fluid-bed dryer, the recycling fluid-bed drying step took more time than the once through drying step described in Examples 1-4.

Example 1

A mixture of methyl alcohol, 83%, and magnesium oxide, 17%, where the particle range of the magnesium oxide was 5-50 μm, was fed into a 4" diameter product container, which was a component of the filter assembly shown in FIG. 1. Compressed air was fed into the inlet head until the pressure above the mixture was 20 psig for 15 minutes. The liquid, methyl alcohol, flowed through the filter assembly and into the discharge head. The mixture in the product container after the filtering process was a stiff cake of magnesium oxide and methyl alcohol with a moisture content of 31%.

The inlet head was depressurized and removed from the product container. The detachable gas distribution plate was installed on the product container. The 4" diameter product container was inverted so the gas distribution plate was on the bottom of the product container. The discharge head and detachable filter assembly were removed from the product container.

The product container and gas distribution plate were transported to a fluid-bed dryer assembly shown in FIG. 4, where the upper plenum had a larger diameter, 11", than the product container, 4". The fluid-bed dryer assembly and product container were sealed, and a heated air stream, 73° F., flowed up through the mixture of magnesium oxide/methyl alcohol at such a rate, 120-140 ft/min at the distribution plate, whereby the bed behaved with incipient fluidization characteristics shown in FIG. 7. After the air stream fluidized the liquid/solid mixture for 15 minutes, the methyl alcohol content of the mixture in the product bowl was 1.4%.

The results of Example 1 show that a non-aqueous solvent, methyl alcohol, can be removed from a bulk solid, magnesium oxide, with a small particles size distribution, 5-50 μm. The physical properties of the liquid/solid mixture was a stiff dry cake after the filtration process, a 31% moisture content. The fluid-bed dryer reduced the moisture content of the cake from 31% to 1.4%, which was a free flowing powder, 5-50 μm.

The fluid-bed dryer apparatus used in Example 1 is shown in FIG. 4, where the upper plenum has a larger diameter than the product container. The larger diameter of the upper plenum 43 reduces the amount of dust on the bag filters 46 shown in FIG. 4.

Example 2

A mixture of acetone, 50%, and titanium, 50%, where the particle range of the titanium was 250-420 μm, was fed into a 4" diameter product container, which was a component of the filter assembly shown in FIG. 1. Compressed air was fed into the inlet head until the pressure above the mixture was 10 psig for 15 minutes. The liquid, acetone, flowed through the filter assembly and into the discharge head. The mixture in the product container after the filtering process had an acetone content of 2%.

The inlet head was depressurized and removed from the product container. The detachable gas distribution plate was installed on the product container. The 4" diameter product container was inverted so the gas distribution plate was on the bottom of the product container. The discharge head and detachable filter assembly were removed from the product container.

The product container and gas distribution plate were transported to a fluid-bed dryer assembly shown in FIG. 4, where the upper plenum had a larger diameter, 11", than the product container, 4". The fluid-bed dryer assembly and product container were sealed, and a heated air stream, 70° F., flowed up through the mixture of titanium/acetone at such a rate, 280-320 ft/min at the distribution plate, whereby the bed behaved with bubbling fluidization characteristics shown in FIG. 7. After the air stream fluidized the liquid/solid mixture for 15 minutes, the acetone content of the mixture in the product bowl was 0.01%.

Example 2 shows that the majority of liquid, 48%, can be removed during the filtration step when the solid, titanium, does not absorb the liquid, acetone. After the filtration step, the material was a free flowing mixture as opposed to the dry cake in Example 1.

Example 3

A mixture of water, 50%, and polyethylene (plastic) beads, 50%, where the particle range of the polyethylene beads was 3000-6000 μm, was fed into a 4" diameter product container, which was a component of the filter assembly shown in FIG. 1. Compressed air was fed into the inlet head until the pressure above the mixture was 10 psig for 15 minutes. The liquid, water, flowed through the filter assembly and into the discharge head. The mixture in the product container after the filtering process had a water content of 3%.

The inlet head was depressurized and removed from the product container. The detachable gas distribution plate was installed on the product container. The 4" diameter product container was inverted so the gas distribution plate was on the bottom of the product container. The discharge head and detachable filter assembly were removed from the product container.

The product container and gas distribution plate were transported to a fluid-bed dryer assembly shown in FIG. 4, where the upper plenum had a larger diameter, 11", than the product container, 4". The fluid-bed dryer assembly and product container were sealed, and a heated air stream, 210° F., flowed up through the mixture of polyethylene beads/water at such a rate, 330-360 ft/min at the distribution plate, whereby the bed behaved with slugging fluidization characteristics shown in FIG. 7. After the air stream fluidized the liquid/solid mixture for 15 minutes, the water content of the mixture in the product bowl was less than 0.01%.

Similar to Example 2, the filtration step in Example 3 removed the majority of the liquid water, 47% of the aqueous solvent (liquid water). However, the particle size of the plastic beads (3000-6000 μm) was much larger than the magnesium oxide (5-50 μm) or the titanium (250-420 μm).

The plastic beads, due to the size and shape of the beads, fluidized with slugging characteristics shown in FIG. 7. Therefore, the plastics beads were dried while behaving as a slugging fluidized bed. Although the solids in Examples 1, 2, and 3 fluidized differently, the fluid-bed apparatus was able to reduce the solvent content.

Example 4

A mixture of isopropyl alcohol, 75%, and polyethylene glycol, 25%, where the particle range of the polyethylene glycol was 125-250 μm, was fed into a product container with a 4" diameter at the gas distribution assembly and a 11" diameter at the filter assembly, which was a component of the filter assembly shown in FIG. 5. The height of the product container was 13".

Nitrogen was fed into the inlet head until the pressure above the mixture was 8 psig for 15 minutes. The liquid, isopropyl alcohol, flowed through the filter assembly and into the discharge head. The mixture in the product container after the filtering process had an isopropyl alcohol content of 30%.

The inlet head was depressurized and removed from the product container. The detachable gas distribution plate was installed on the product container. The 4" diameter product container was inverted so the gas distribution plate was on the bottom of the product container. The discharge head and detachable filter assembly were removed from the product container.

The product container and gas distribution plate were transported to a fluid-bed dryer assembly shown in FIG. 4, where the upper plenum had a larger diameter, 11", than the distribution plate, 4". The fluid-bed dryer assembly and product container were sealed, and a heated nitrogen gas stream, 95° F., flowed up through the mixture of polyethylene glycol/Isopropyl alcohol at such a rate, 130-230 ft/min at the distribution plate, whereby the bed behaved with smooth/bubbling fluidization characteristics shown in FIG. 7. After the nitrogen gas stream fluidized the liquid/solid mixture for 30 minutes, the isopropyl alcohol content of the mixture in the product bowl was 100 ppm.

Example 4 shows a nitrogen gas stream used during the fluid-bed drying step. Nitrogen and other inert gases are commonly used to dry non aqueous solvents to lower the oxygen concentration in the apparatus, which reduces the risk of an explosion.

During the fluid-bed drying step, the fluidization characteristics went from bubbling to smooth, shown in FIG. 7, as the material was dried.

A different product container assembly, shown in FIG. 5, was used in Example 4. The larger diameter of the filter assembly increases the surface area of the filter cloth during the filtration step and increases the expansion zone above the fluidized bed.

Example 5

A mixture of isopropyl alcohol, 85%, and polyethylene glycol, 15%, where the particle range of the polyethylene glycol was 50-300 μm, was fed into a product container with a 16" diameter at the gas distribution assembly and a 16" diameter at the filter assembly, which was a component of the filter assembly shown in FIG. 1. The height of the product container was 25".

Argon was fed into the inlet head until the pressure above the mixture was 60 psig for 60 minutes. The liquid, isopropyl alcohol, flowed through the filter assembly and into the discharge head. The mixture in the product container, a wet cake, after the filtering process had an isopropyl alcohol content of 45%.

The inlet head was depressurized and removed from the product container. The detachable gas distribution plate was installed on the product container. The 16" diameter product container was inverted so the gas distribution plate was on the bottom of the product container. The discharge head and detachable filter assembly were removed from the product container.

The product container and gas distribution plate were transported to a fluid-bed dryer assembly shown in FIG. 6, where the upper plenum had a diameter, 16", identical to the distribution plate, 16". The fluid-bed dryer assembly and product container were sealed, and a heated argon gas stream, 95° F., flowed up through the mixture of polyethylene glycol/isopropyl alcohol at such a rate, 100-240 ft/min at the distribution plate, where the bed behaved with bubbling fluidization characteristics shown in FIG. 7. After the argon gas stream fluidized the liquid/solid mixture for 120 minutes, the isopropyl alcohol content of the mixture in the product bowl was 100 ppm.

Example 5 shows a larger product container, 16" diameter, than previous examples, 4" diameter. A different fluid-bed assembly, shown in FIG. 6, was also used for Example 5. Although more material was present in above the fluidized bed of material in Example 5 than Example 4, the fluid-bed drying step adequately dried the material to moisture content of 100 ppm.

The argon gas stream in Example 5 was recirculated. The gas stream from the fluid-bed dryer was passed through a condenser, which removed the majority of the solvent in the argon gas stream. The argon gas stream was heated by a heat exchanger before being recirculated to the fluid-bed dryer apparatus. Since a small amount of solvent was recirculated to the inlet of the fluid-bed dryer, the recycling fluid-bed drying step took more time than the once through drying step described in Example 4.

Example 6

A mixture of isopropyl alcohol, 75%, and polyethylene glycol, 25%, where the particle range of the polyethylene glycol was 100-500 μm, was fed into a product container with a 16" diameter at the gas distribution assembly and a 16" diameter at the filter assembly, which was a component of the filter assembly shown in FIG. 1. The height of the product container was 25".

Argon was fed into the inlet head until the pressure above the mixture was 25 psig for 60 minutes. The liquid, isopropyl alcohol, flowed through the filter assembly and into the discharge head. The mixture in the product container, a dry cake, after the filtering process had an isopropyl alcohol content of 35%.

The inlet head was depressurized and removed from the product container. The detachable gas distribution plate was installed on the product container. The 16" diameter product container was inverted so the gas distribution plate was on the bottom of the product container. The discharge head and detachable filter assembly were removed from the product container.

The product container and gas distribution plate were transported to a fluid-bed dryer assembly shown in FIG. 6, where the upper plenum had a diameter, 16", identical to the distribution plate, 16". The fluid-bed dryer assembly and product container were sealed, and a heated argon gas stream, 95° F., flowed up through the mixture of polyethylene glycol/isopropyl alcohol at such a rate, 100-240 ft/min at the distribution plate, whereby the bed behaved with bubbling fluidization characteristics shown in FIG. 7. After the argon gas stream fluidized the liquid/solid mixture for 120 minutes, the isopropyl alcohol content of the mixture in the product bowl was 100 ppm.

The average particle size of the polyethylene glycol described in Example 6 was larger than the average particle size described in Example 5. Therefore, the argon gas stream flow rate was higher in Example 6, 140-300 ft/min, than in Example 5, 100-240 ft/min, during the fluid-bed drying step. The higher gas flow rates were required because larger particles, with the same particle density and shape, require higher gas velocities for fluidization.

Example Parameters and Results

The filter/dryer procedure was performed for several mixtures of bulk solids and liquids. The bulk solids ranged in size from 5 μm to 6 mm in diameter. The liquids were aqueous and non aqueous. The results of the tests are shown in Table 1.

Selected Conclusions from Examples

1) The filter/dryer assembly can remove liquids from bulk solids with a wide range of particle size, 5 μm to 6 mm.

2) The filter/dryer assembly also has the ability to remove aqueous and non-aqueous liquids from bulk solids.

3) The initial moisture of the liquid/bulk solids feed to the filter/dryer can be as high as 83% and yet still achieve good moisture removal.

TABLE I

| EXAMPLE No. | Solid | Liquid | Diameter of container (in) | Particle Range (μm) | Initial Moisture | Operating Pressure of filter (psig) | Moisture After Filtering |
|---|---|---|---|---|---|---|---|
| 1 | Magnisum Oxide | Methyl Alcohol | 4 | 5-50 | 83% | 20 | 31% |
| 2 | Titanium Beads | Acetone | 4 | 250-420 | 50% | 10 | 2% |
| 3 | Plastic Beads | Water | 4 | 3000-6000 | 50% | 10 | 3% |
| 4 | Polyethylene Glycol | Isopropyl Alcohol | 4 | 125-250 | 75% | 8 | 30% |
| 5 | Polyethylene Glycol | Isopropyl Alcohol | 16 | 50-300 | 85% | 60 | 45% |
| 6 | Polyethylene Glycol | Isopropyl Alcohol | 16 | 100-500 | 75% | 25 | 35% |

| EXAMPLE No. | Gas for Drying | Inlet gas temperature | Fluidization Velocity (ft/min) | Drying Time (min) | Moisture After Fluid-Bed | Observations |
|---|---|---|---|---|---|---|
| 1 | Air | 73 | 120-140 | 15 | 1.40% | stiff cake after filtration cycle |
| 2 | Air | 70 | 280-320 | 15 | 0.01% | free flowing |
| 3 | Air | 210 | 330-360 | 15 | 0.00% | free flowing |
| 4 | Nitrogen | 95 | 130-230 | 30 | 100 ppm | began as a slurry and became a free flowing bulk solid |
| 5 | Argon | 95 | 100-240 | 120 | 100 ppm | required mechanical agitation during drying |
| 6 | Argon | 95 | 140-300 | 120 | 100 ppm | free flowing |

What is claimed is:

1. A filter-dryer apparatus employing a single product container for both filtering and drying operations, comprising:

a container having an upper end including an inlet to receive a liquid containing particulate material, the container having an opposing lower end being detachably attached to a filter assembly through which the liquid is filtered resulting in a filtration cake, the container upper end being detachably attached to a gas distribution plate, means for inverting the container, resulting in the filter cake falling upon the gas distribution plate, and a fluid bed assembly having means for supplying an upward flow of air and further having an upper plenum and a lower plenum, the upper plenum having means for detachable attachment to the lower end of the container upon inversion, and the lower plenum having means for detachable attachment to the upper end of the container, by which the filter cake is fluidized by upward flowing air of the fluid bed assembly and dried.

2. The apparatus accordingly to claim 1, wherein the container has a detachable support plate for supporting said filter system assembly.

3. The apparatus according to claim 1 wherein the container is cylindrical in shape.

* * * * *